US011335087B2

(12) United States Patent
Xu et al.

(10) Patent No.: US 11,335,087 B2
(45) Date of Patent: May 17, 2022

(54) METHOD AND SYSTEM FOR OBJECT IDENTIFICATION

(71) Applicant: Hangzhou Glority Software Limited, Zhejiang (CN)

(72) Inventors: Qingsong Xu, Zhejiang (CN); Qing Li, Zhejiang (CN)

(73) Assignee: Hangzhou Glority Software Limited, Zhejiang (CN)

( * ) Notice: Subject to any disclaimer, the term of this patent is extended or adjusted under 35 U.S.C. 154(b) by 0 days.

(21) Appl. No.: 16/797,590

(22) Filed: Feb. 21, 2020

(65) Prior Publication Data

US 2021/0027061 A1   Jan. 28, 2021

(30) Foreign Application Priority Data

Jul. 25, 2019 (CN) .......................... 201910673935.9

(51) Int. Cl.
*G06V 20/20* (2022.01)
(52) U.S. Cl.
CPC .................... *G06V 20/20* (2022.01)
(58) Field of Classification Search
CPC ............ G06K 9/00624; G06K 9/00671; G06T 2207/30188
See application file for complete search history.

(56) References Cited

U.S. PATENT DOCUMENTS

| 2005/0192760 A1* | 9/2005 | Dunlap | A01H 1/04 |
| | | | 702/19 |
| 2006/0075327 A1* | 4/2006 | Sriver | G06F 40/114 |
| | | | 715/206 |
| 2013/0293734 A1* | 11/2013 | Fan | G06K 9/46 |
| | | | 348/222.1 |
| 2014/0205154 A1* | 7/2014 | De Souza | G06K 9/00657 |
| | | | 382/110 |
| 2017/0206415 A1* | 7/2017 | Redden | G06V 20/38 |
| 2018/0322353 A1* | 11/2018 | Ralls | G06F 16/51 |

(Continued)

FOREIGN PATENT DOCUMENTS

| CN | 106095884 A | 11/2016 |
| CN | 108108767 A | 6/2018 |

(Continued)

OTHER PUBLICATIONS

Office Action with English Translation for Chinese Patent Application No. 201910673935.9 dated Jan. 22, 2021; 28 pages.

*Primary Examiner* — David Bilodeau
(74) *Attorney, Agent, or Firm* — Crowell & Moring LLP (57) ABSTRACT

The present disclosure relates to a method and system for object identification. A method for object identification is provided, comprising: acquiring a first image presenting at least a part of an object from a user; identifying a category of the object through a pre-established object identification model based on the first image, to obtain at least one result; searching a rule database containing at least one set of confusable object categories using the at least one result, to determine whether there is a confusable object category corresponding to the at least one result; and if there is a confusable object category corresponding to the at least one result in the rule database, returning the at least one result and the confusable object category corresponding thereto to the user.

20 Claims, 6 Drawing Sheets

(56) References Cited

U.S. PATENT DOCUMENTS

| | | | | |
|---|---|---|---|---|
| 2019/0318405 A1* | 10/2019 | Hu | ................ | G06F 16/55 |
| 2020/0005062 A1* | 1/2020 | Lliev | ................ | G06K 9/6256 |
| 2020/0005063 A1* | 1/2020 | Ralls | ................ | G06F 16/5838 |
| 2020/0279374 A1* | 9/2020 | King | ................ | G06K 9/00697 |
| 2021/0011945 A1* | 1/2021 | Xu | ................ | G06K 9/6272 |
| 2021/0056338 A1* | 2/2021 | Padwick | ................ | G06T 7/11 |

FOREIGN PATENT DOCUMENTS

| | | |
|---|---|---|
| CN | 109344851 A | 2/2019 |
| CN | 109409423 A | 3/2019 |
| CN | 109447150 A | 3/2019 |
| CN | 109472280 A | 3/2019 |
| CN | 109858448 A | 6/2019 |

* cited by examiner

METHOD AND SYSTEM FOR OBJECT IDENTIFICATION

This application claims priority under 35 U.S.C. § 119 to Chinese Patent Application No. 201910673935.9 filed on Jul. 25, 2019, the entire contents of which are hereby incorporated by reference.

TECHNICAL FIELD

The present disclosure relates to the field of computer vision, and more particularly, to methods and systems for object identification.

BACKGROUND

In the field of computer vision, there is a need to identify a variety of objects. However, in most cases, a user needs to search and identify a category of the object by himself/herself through an auxiliary tool such as a search engine and a professional dictionary, according to characteristics of the object. Such a search is very time consuming and not very accurate.

In recent years, applications have appeared in which an image of the object is captured and then the image is used as an input to obtain information on the category of the object. However, there may be a plurality of similar results for the category of the object identified by the application, and an accurate result cannot be identified for the user.

Accordingly, there is a need for improved methods and systems for identifying a category of an object.

SUMMARY

The present disclosure provides a novel method and system for object identification.

According to a first aspect of the present disclosure, there is provided a method for object identification, comprising: acquiring a first image presenting at least a part of an object from a user; identifying a category of the object through a pre-established object identification model based on the first image, to obtain at least one result; searching a rule database containing at least one set of confusable object categories using the at least one result, to determine whether there is a confusable object category corresponding to the at least one result; and if there is a confusable object category corresponding to the at least one result in the rule database, returning the at least one result and the confusable object category corresponding thereto to the user.

The method further comprises providing prompt information to the user, the prompt information indicating a distinguishing feature between the at least one result and the confusable object category corresponding thereto and prompting the user to acquire a second image of the object capable of presenting the distinguishing feature. The rule database contains names of the at least one set of confusable object categories and distinguishing features of the confusable object categories, and the prompt information is based on the rule database. Determining that at least two object categories belong to confusable object categories may be performed by one or more of: 1) the at least two object categories are common confusable object categories; 2) when the user provides an image of one object category of the at least two object categories for other users to authenticate and vote on the one object category, the numbers of other object categories in the at least two object categories in the authenticating and voting results are each larger than a threshold; and 3) the numbers of other object categories in the at least two object categories are each larger than a threshold in the result of judging the one of the at least two object categories by all users. Furthermore, it is also possible to determine that at least two object categories belong to confusable object categories by: using a test sample set of any one of the at least two object categories to test the object identification model that is established using a training sample set; and the identification result in the test result is that the numbers of the at least two object categories are each larger than a threshold. When the object is a plant, the at least one result and the confusable object category corresponding thereto comprise at least two varieties in the same species, or at least two species.

In the method, the prompt information is provided to the user in one of the following ways: text, picture, or a combination of picture and text.

In the method, the rule database further comprises shooting rules for a confusable plant category, that correspond to distinguishing features of the confusable plant category, and the prompt information further comprises prompting the user for the shooting rules, the shooting rules comprising acquiring an image of a specific part of the object, acquiring an image of at least a part of the object at different angles, or acquiring an image of at least a part of the object at different distances.

The method further comprises: acquiring position information of the user when acquiring the first image, and displaying category information of at least one object nearby the position to the user according to the position information, wherein the category information of the at least one object was previously captured and stored by the user or other users. If a plurality of images of the at least one object have been previously captured by the user or other users, a most recent image of the plurality of images is displayed to the user.

The method further comprises: determining a category of the object through the object identification model based on the acquired second image of the object capable of presenting the distinguishing feature.

According to a second aspect of the present disclosure, a system is provided, comprising one or more processors, and one or more memories configured to store a series of computer-executable instructions and computer-accessible data associated with the series of computer-executable instructions, wherein when executed by the one or more processors, the series of computer-executable instructions cause the one or more processors to perform the method recited in the present disclosure.

According to a third aspect of the present disclosure, a non-transitory computer-readable medium is provided, having stored thereon a series of computer-executable instructions that, when executed by one or more processors, cause the one or more processors to perform the method recited in the present disclosure.

Other features of the present disclosure and advantages thereof will become apparent from the following detailed description of exemplary embodiments of the present disclosure with reference to the accompanying drawings.

BRIEF DESCRIPTION OF THE DRAWINGS

The accompanying drawings, which constitute a part of this specification, describe embodiments of the present disclosure, and together with the description, serve to explain the principles of the present disclosure.

The present disclosure will become more thoroughly understood from the detailed description given below with reference to the accompanying drawings, wherein.

DETAILED DESCRIPTION

Various exemplary embodiments of the present disclosure will be described in detail below with reference to the accompanying drawings. It should be noted that: relative arrangements of parts and steps, numerical expressions, and numerical values set forth in these embodiments do not limit the scope of the present disclosure unless specifically stated otherwise. In the following description, numerous details are set forth in order to better explain the present disclosure. However, it is understood that the disclosure may be practiced without these details.

The following description of various exemplary embodiments is merely illustrative, and those of ordinary skill in the art will recognize that other variations, modifications, and alternatives are possible. In this disclosure, the terms "first", "second" and the like are used merely to distinguish one element or step from another, and are not intended to imply a temporal order, priority, or importance.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" of the present disclosure are not intended to be interpreted as excluding the existence of additional embodiments that also incorporate the recited features.

Techniques, methods, and devices known to those of ordinary skill in the art may not be discussed in detail, but are to be considered a part of the specification where appropriate.

The inventors of the present application have intensively studied a method and a system for object identification. For simplicity of description, the following exemplary embodiments take plants as examples of the object, but it should be appreciated that the "object" in the present disclosure includes, but is not limited to a/an animal, character, scene, natural object, building, goods, food, medicine, and/or commodity, etc.

Figure 1:
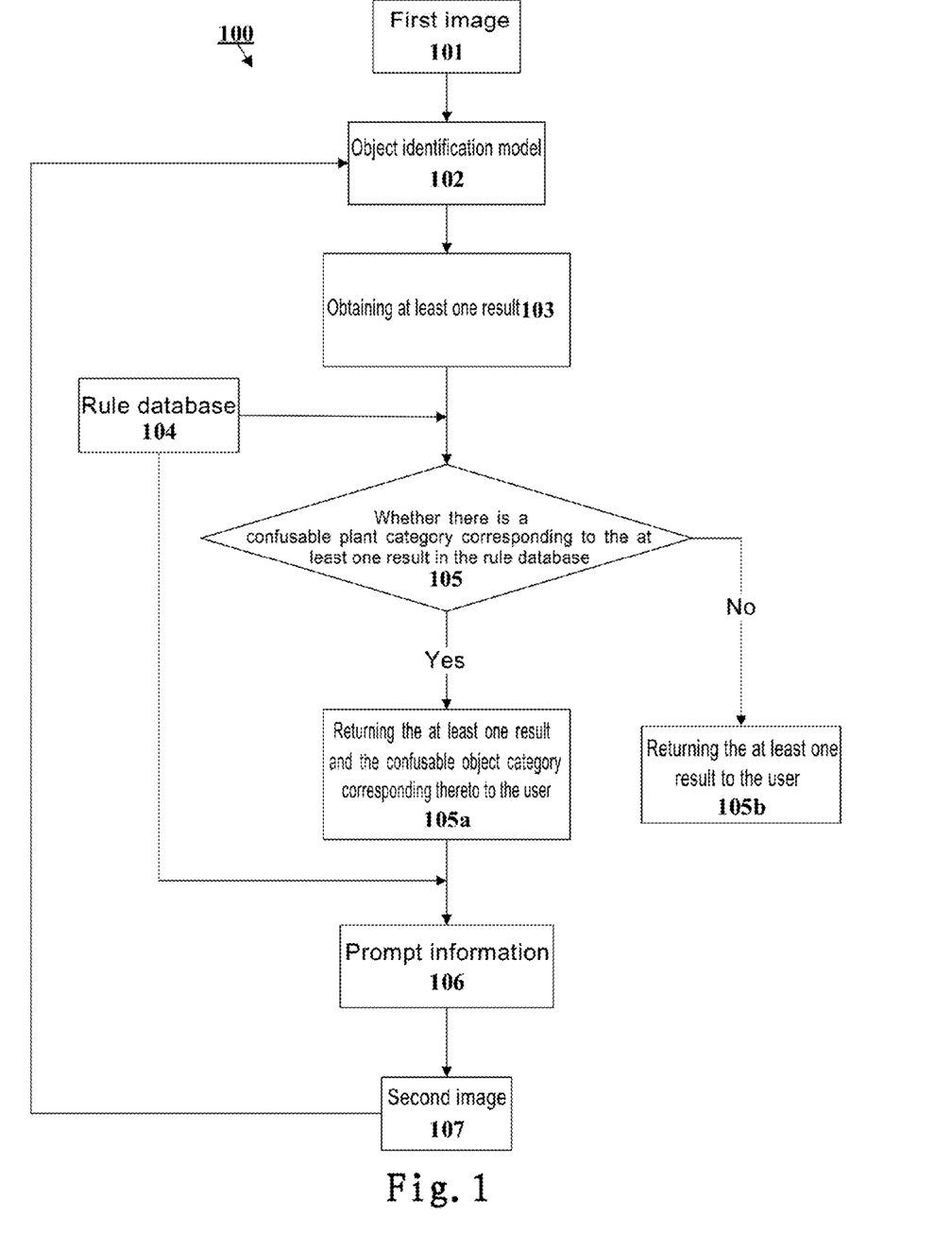
FIG. 1 illustrates a schematic diagram of an overall architecture of a system according to one exemplary embodiment of the present disclosure.

FIG. 1 illustrates a schematic diagram of an overall architecture 100 of a system according to one exemplary embodiment of the present disclosure. As shown in FIG. 1, the system receives a first image 101 presenting at least a part of a plant from a user. The user is interested in the plant and desires to know information on a category to which the plant belongs. The first image 101 may be previously stored by the user or shoot in real time by the user. The user can shoot the plant image through a lens built in a portable device or an external lens connected with the portable device.

After receiving the first image 101, the system analyzes it by means of a pre-established object identification model 102 to obtain information on the plant category presented in the first image 101. In the present exemplary embodiment, the object identification model 102 is a plant identification model. When the object is of other types, the corresponding object identification models may be identification models for other types. The object identification model may include a plurality of object identification models divided according to geographical areas. For example, the geographical areas may be divided according to North America, East Asia, Europe and other larger areas, or according to a Yangtze river delta, a Zhujiang delta, a northwest area and other smaller areas in China. Different object identification models can be invoked according to the position information of the plants, for example, the object identification models in the United States and in China are different object identification models respectively trained and established by using different plant samples in respective geographic areas.

The object identification model 102 may first determine whether the image content in the first image 101 belongs to a plant or not, and if not, the system prompts the user an image error until the first image 101 presenting the plant is received from the user. Because a picture of the plant acquired by the user usually has a background object or there are portions of other plants around the plant to be identified in the picture, the area of the plant to be identified can be accurately found in the picture by adopting a multi-object detection method or a mask-rcnn method and the like, for further identification of the object identification model. Thereafter, the object identification model can identify the first image 101, and return at least one result 103 with respective possibilities. For example, the system may rank a plurality of possible plant category information from high to low according to the likelihood of the identified result(s). The object identification model 102 may be obtained by training a neural network using a training sample set including a large number of plant images. The neural network training mentioned above will be further described below with reference to FIG. 2.

In real-world environments, there are often a variety of morphologically similar plants. To further improve the accuracy of the identification, the system creates in advance a rule database 104 containing a plurality of sets of names of confusable plant categories and distinguishing features of these confusable plant categories, while the rule database 104 contains shooting rules that should be taken for each distinguishing feature. Rule database 104 will be further described below with reference to FIG. 4. For at least one returned result 103, a search is performed in the rule database 104, and it is determined whether or not a confusable plant category corresponding to at least one object 103 exists in the rule database 104 (105). If so, the at least one object 103 is returned to the user together with the confusable plant category corresponding thereto (105a), otherwise the at least one object 103 is returned to the user (105b). When the at least one object 103 and the confusable plant category corresponding thereto are returned to the user, the system may provide the user with prompt information 106 based on the content in the rule database 104. The prompt information 106 indicates distinguishing features of several plant categories belonging to confusable plant categories, and is provided to the user according to the shooting rule(s) corresponding to the distinguishing features in the rule database 104 to acquire a second image 107 of the plant capable of presenting the distinguishing features. Based on the acquired second image 107, the system further identifies the category of the plant through the object identification model 102.

It should be noted that the first image 101 and the second image 107 both may be static images or dynamic images. The confusable plant category may belong to different varieties of the same species or may belong to different species.

Figure 2:
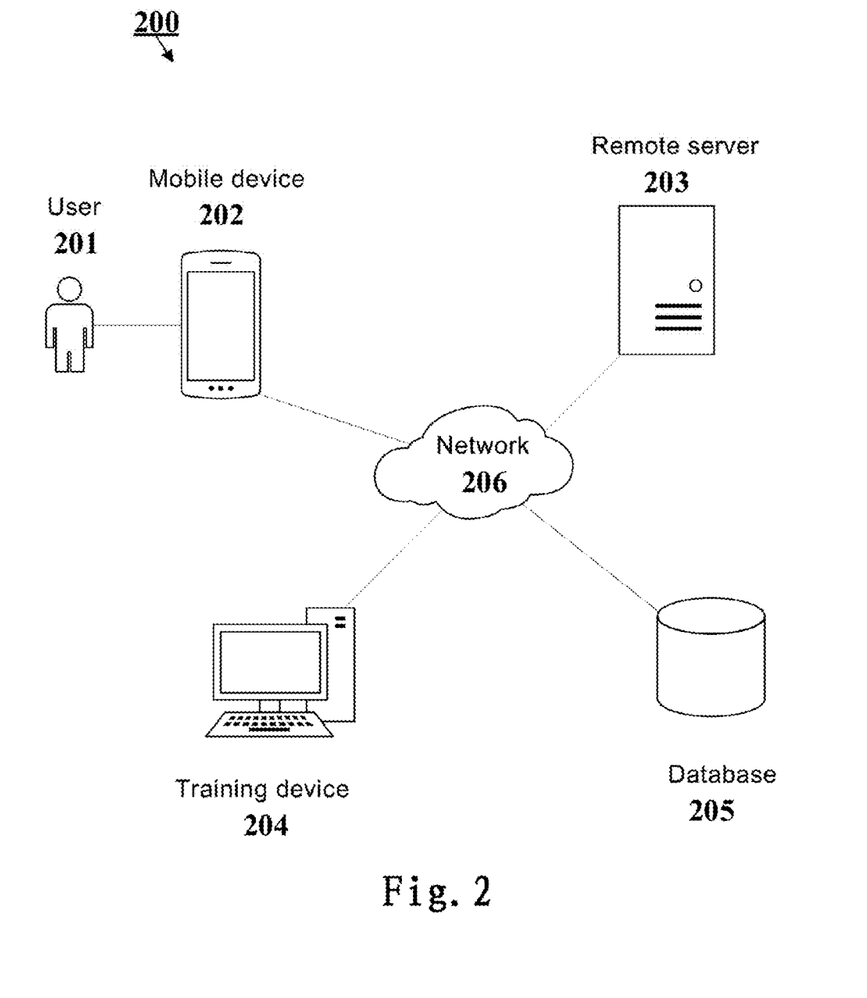
FIG. 2 illustrates a schematic diagram of a network environment for the system shown in FIG. 1.

FIG. 2 illustrates a schematic diagram of a network environment 200 for the system shown in FIG. 1. The network environment 200 of the system may include a mobile device 202, a remote server 203, a training device 204, and a database 205, which are coupled to each other by wire or wirelessly through a network 206. The network 205 may be embodied as a wide area network (such as a mobile telephone network, a public switched telephone network, a satellite network, the internet, etc.), a local area network (such as Wi-Fi, Wi-Max, ZigBee™, Bluetooth™, etc.), and/or other forms of networking functionality.

The mobile device 202 may be a mobile phone, a tablet computer, a laptop computer, a personal digital assistant, and/or other computing apparatuses configured to capture, store, and/or transmit images such as digital photographs. Thus, the mobile device 202 may include an image capturing apparatus such as a digital camera and/or may be configured to receive images from other apparatuses. The mobile device 202 may include a display. The display may be configured to provide one or more user interfaces to a user 201, and the user interface may include a plurality of interface elements, with which the user 201 may interact, and so on. For example, the user 201 may take a picture of a plant using the mobile device 202 and upload or store the image. The mobile device 202 may output information about the category of the plant to the user and recommend maintenance criteria or the like appropriate for the plant.

The remote server 203 may be configured to analyze plant images and the like received from the mobile device 202 via the network 206 to determine the category of the plant, and recommend maintenance criteria and the like. The remote server 203 may also be configured to create and train the object identification model 102.

The training device 204 may be coupled to the network 206 to facilitate training of the object identification model 102. The training device 204 may have multiple CPUs and/or GPUs to assist in training the object identification model 102.

In one embodiment, the object identification model 102 may be established based on training of a neural network as follows:

a certain number of image samples labeled with corresponding information are acquired for each plant category, and the number of the image samples prepared for each plant category may be equal or unequal. The corresponding information labeled for each image sample may include a name of the plant (including a school name, an alias, a category name of a botanical classification, etc.) in the image sample. The image samples acquired for each plant category may include images of different angles, different lighting conditions, different seasons (e.g., the same plant may have different morphologies in different seasons), different times (e.g., the same plant may have different morphologies in the morning and night of each day), different growing environments (e.g., the same plant may have different morphologies in indoor and outdoor growth), different geographical locations (e.g., the same plant may have different morphologies in different geographical locations) of the plant of that category, as far as possible. In such cases, the corresponding information labeled for each image sample may also include information on the angle, lighting, season, time, growth environment, geographic location and the like of the image sample.

The image samples subjected to the labeling process are divided into a training sample set for training the object identification model and a test sample set for testing the training result. Typically, the number of samples in the training sample set is significantly greater than the number of samples in the test sample set, e.g., the number of samples in the test sample set accounts for 5% to 20% of the number of the total image samples, and the number of samples in the corresponding training sample set accounts for 80% to 95% of the number of the total image samples. Those skilled in the art will appreciate that the number of samples in the training sample set and the test sample set may be adjusted as desired.

The neural network is trained by using the training sample set, and the output accuracy of the trained neural network is tested by using the test sample set. If the output accuracy does not meet the requirement, the number of the image samples in the training sample set is increased, and the neural network is trained again by using the updated training sample set until the output accuracy of the trained neural network meets the requirement. If the output accuracy meets the requirement, the training ends. Thus, the trained neural network whose output accuracy meets the requirement can be used as a trained object identification model.

The neural network may include, for example, a depth Convolution Neural Network (CNN) or a depth residual network (Resnet). The depth convolution neural network is a depth feed-forward neural network, that scans the plant image by utilizing a convolution kernel, extracts the feature (s) to be identified in the plant image, and further identifies the feature(s) to be identified of the plant. In addition, in the process of identifying the plant image, the original plant image can be directly input into the depth convolution neural network model without preprocessing the plant image. Compared with other identification models, the deep convolution neural network model has higher identification accuracy and identification efficiency. Compared with the deep convolution neural network model, the deep residual network model is additionally provided with an identity mapping layer, which can avoid the phenomenon that the accuracy of the convolution neural network is saturated or even reduced as the network depth (the number of laminated layers in the network) increases. The identity mapping function of the identity mapping layer in the residual network model must satisfy the following: a sum of the identity mapping function and the input of the residual network model is equal to an output of the residual network model. After the identity mapping is introduced, the residual network model is more sensitive to the change of the output, which can greatly improve the identification accuracy and the identification efficiency of the plant physiological cycle identification, thereby further improving the identification accuracy and the identification efficiency of the plant.

It should be noted that the concept of the invention may be practiced using other known or future developed training and identification models.

The database 205 may be coupled to the network 206 and provide data needed by the remote server 203 for relevant calculations. For example, the database 205 may include the rule database 104 to store names of the confusable plant categories, distinguishing features of the confusable plant categories, and shooting rules corresponding to the distinguishing features. The database 205 may also include a material database containing materials such as wallpaper. For example, a large number of wallpaper images may be stored in the material database, and when the category of the plant is identified, the category may be associated with a corresponding wallpaper stored in the material database for use or collection by the user. The database may be implemented using a variety of database techniques known in the art. The remote server 203 may access the database 205 for related operations as needed.

It should be understood that the network environment herein is merely an example. Those skilled in the art may add more devices or delete some apparatuses as needed, and may make modifications to the functions and configurations of some apparatuses.

Figure 3:
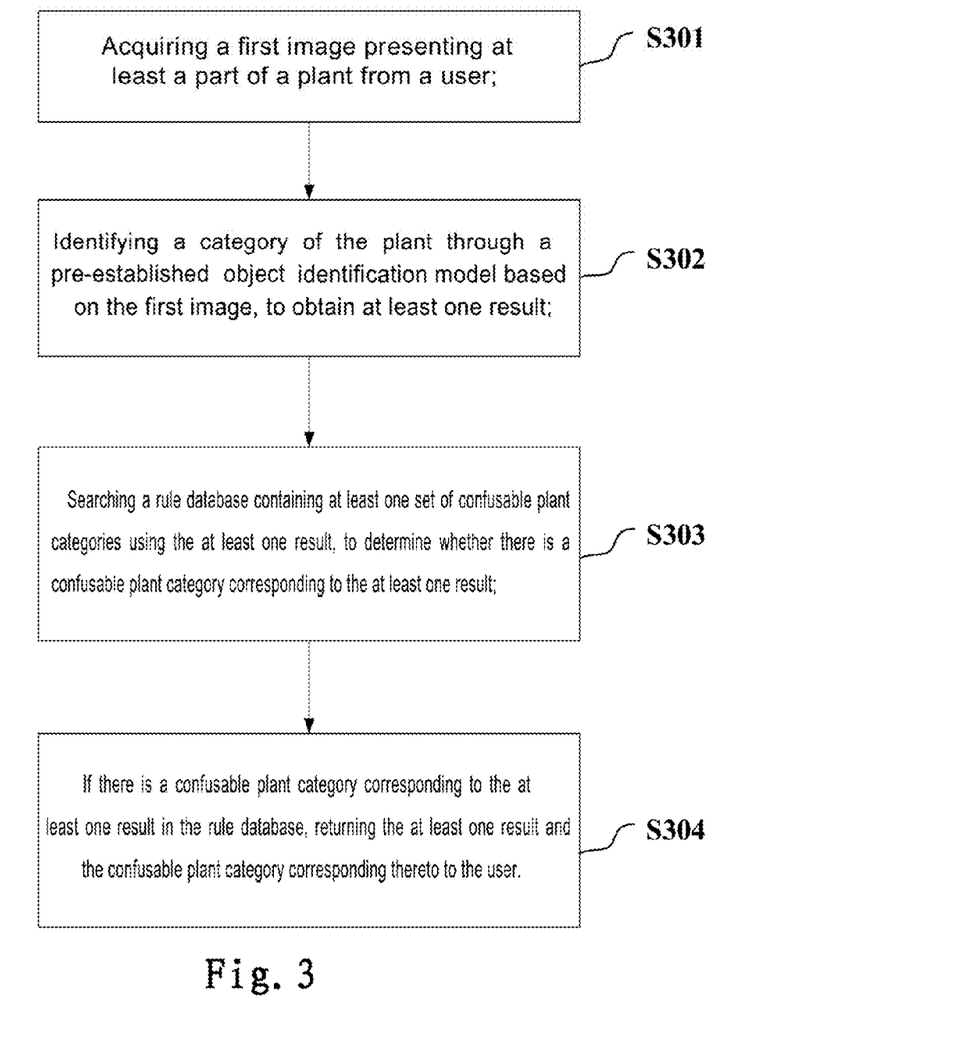
FIG. 3 illustrates a flowchart of a method for object identification according to one exemplary embodiment of the present disclosure.

A method for object identification according to one exemplary embodiment of the present disclosure is described below with reference to FIG. 3.

In step S301, acquiring a first image presenting at least a part of a plant from a user, as previously mentioned, the first image may be previously stored by the user or shot in real time by the user. The user can shoot a plant image through a lens built in the portable device or an external lens connected with the portable device.

In step S302, identifying a category of the plant through a pre-established object identification model based on the acquired first image, to obtain at least one result.

In step S303, searching a rule database containing at least one set of confusable plant categories using the at least one result, to determine whether there is a confusable plant category corresponding to the at least one result.

In step 304, if there is a confusable plant category corresponding to the at least one result in the rule database, returning the at least one result and the confusable plant category corresponding thereto to the user. After this step, the prompt information may be provided to the user based on the rule database.

As previously mentioned, the at least one result may have respective possibilities, and if the at least one result only includes one result having a likelihood greater than a threshold, the one result may be used to search the rule database to determine whether it has a confusable plant category, if any, then to provide prompt information to the user. The prompt information indicates a distinguishing feature between the one result and the confusable plant category, and is provided to the user according to the shooting rule corresponding to the distinguishing feature in the rule database to acquire a second image of the plant capable of presenting the distinguishing feature.

If the at least one result includes at least two results having a probability greater than a threshold, and if the at least two results exist in the rule database, prompt information that may indicate distinguishing features of the at least two results is provided to the user. In contrast, if the at least two results do not exist in the rule database, the at least two results are added to the rule database as new confusable object categories, and the distinguishing features of the new confusable object categories are labelled to be supplemented. Relevant information will be pushed collectively through the system to respective personnel to supplement the distinguishing features of the newly added confusable object categories and update the rule database.

Figure 4:
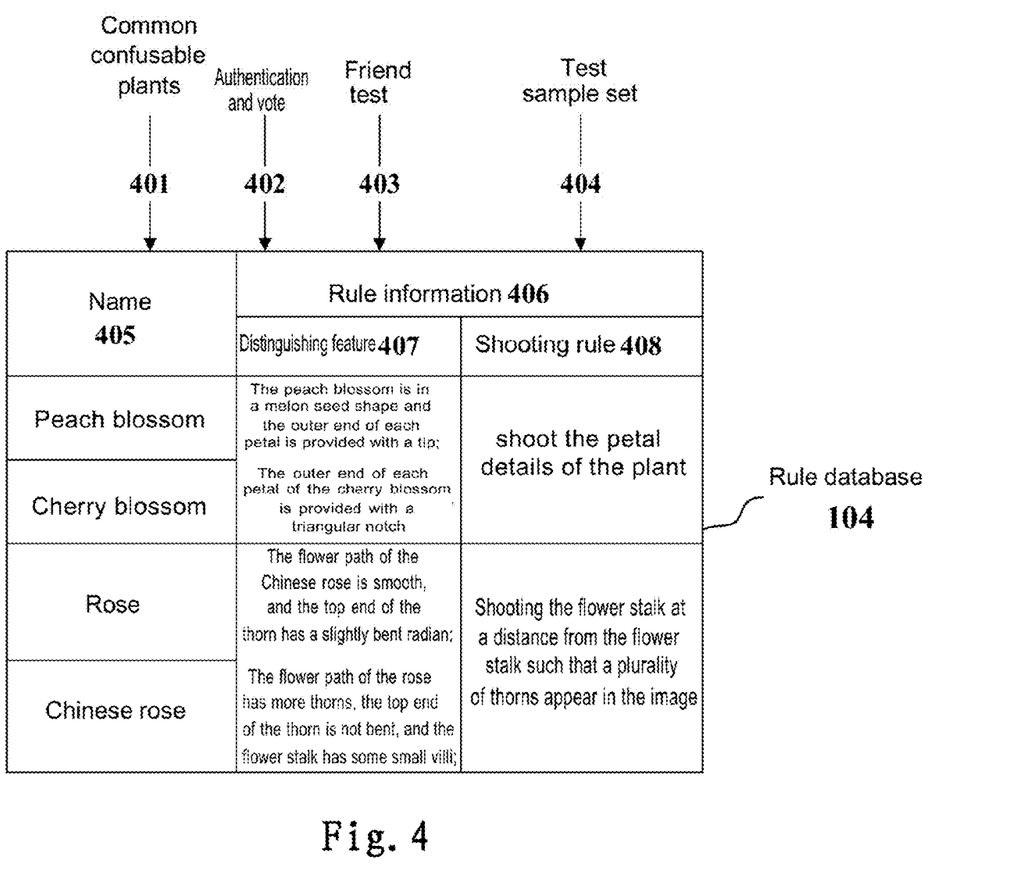
FIG. 4 illustrates a schematic diagram of a rule database according to one exemplary embodiment of the present disclosure.

FIG. 4 illustrates a schematic diagram of a rule database 104 according to one exemplary embodiment of the present disclosure.

The rule database 104 includes a variety of information relating to the confusable plant categories. It may be determined by one or more approaches that a plurality of plants belong to the confusable plant categories.

For example, in a first approach, it may be determined that a plurality of plants belong to common confusable plant categories (401). For example, winter jasmine and forsythia, peach blossom and cherry blossom, etc. belong to confusable plant categories common in life, according to the common sense.

In a second approach, a determination may be made according to the authenticating and voting functionality within an application installed in the user device (402). For example, when the user's identification of a certain plant is uncertain, an authentication or vote can be initiated within the application, including candidate options for a plurality of plant categories, which may be user-defined or automatically chosen by the system. When the number of occurrences of certain candidate options in the authenticating or voting results reaches a threshold, the system identifies these candidate options as confusable plant categories. In one example, three candidate options are included in the authentication or vote: rose, Chinese rose and peony. In total, 500 valid feedback results are received, wherein the number of occurrences of rose, Chinese rose and peony is 250, 200 and 50, respectively, and the threshold is 100 (the threshold may be preset or calculated according to the number of the valid feedback results (e.g., the threshold and the number of the valid feedback results are in a certain proportion)). Thus, rose and Chinese rose are identified as confusable plant categories.

In a third approach, a determination may be made according to a friend test function within the application (403). For example, the user provides a plant image and uploads the plant image to the friend test function, and candidate options of a plurality of plant categories are listed for all users to make determination and selection. When the number of candidate options selected as wrong answers reaches a threshold, the plant categories corresponding to the wrong answers and correct answers are considered to belong to confusable plant categories. In one example, the user uploads an image of a rose to the friend test function, and sets three candidate options: rose, Chinese rose and rosebush. A total of 500 valid guesses are received, where the number of occurrences of rose, Chinese rose and rosebush is 200, 150 and 150, respectively, and the threshold is 100 (the threshold may be predetermined or calculated based on the number of the valid guesses (e.g., the threshold and the number of the valid guesses are in a certain proportion)). Thus, rose, Chinese rose and rosebush are identified as confusable plant categories.

In a fourth approach, it can be determined from intermediate results in training the identification model that a plurality of plants belong to confusable plant categories. As previously described, the system establishes an object identification model by the training sample set and tests the object identification model with a test sample set (404). When the number of occurrences of the plurality of plant categories in the test result is greater than a threshold, it is determined that the plurality of plant categories belong to confusable plant categories. For example, cherry blossom includes a plurality of varieties, such as Prunus Persica, Fructus Pruni Pseudocerasi, Veronica Persica, etc. A test sample set containing 1000 images of Prunus Persica to the object identification model for identification test, wherein the test result shows that: 500 were Prunus Persica, 300 were Fructus Pruni Pseudocerasi, 100 were Veronica Persica, and 100 were other similar species. If the threshold is set to 200 (the threshold may be preset or calculated based on the number of the valid test results (e.g., the threshold and the number of the valid test results are in a certain proportion)), the Prunus Persica and Fructus Pruni Pseudocerasi are determined to be confusable plant categories.

After acquiring the data of the confusable plant categories, the names 405 of the confusable plant categories are stored in the rule database 104. The distinguishing feature 407 is derived from the feature of each plant in a set of confusable plant categories and a shooting rule 408 corresponding to the distinguishing feature is specified. The distinguishing feature 407 and the shooting rule 408 constitute rule information 406. Rule information 406 is mapped to the name 405 of the confusable plant category and is also stored in the rule database 104. Prompt information is sent to the user based on the rule information 406. Specifically, the prompt information may include two parts. A first part of the prompt information is sent based on the distinguishing feature 407 informing the user differences between the confusable plant categories, and a second part of the prompt information is sent to the user based on the shooting rule 408 prompting the user to acquire a specific image capable of presenting the distinguishing feature of the plant for further identification of the plant to improve the accuracy of identification.

In one example, a set of confusable plant categories includes peach blossom and cherry blossom, and the distinguishing features mapped thereto are as follows: the peach blossom is in a melon seed shape and the outer end of each petal is provided with a tip; the outer end of each petal of the cherry blossom is provided with a triangular notch; the shooting rule is: shooting the petal details.

In another example, a set of confusable plant categories includes rose and Chinese rose, and the distinguishing features mapped thereto are as follows: the flower path of the Chinese rose is smooth, and the top end of the thorn has a slightly bent radian; the flower path of the rose has more thorns, the top end of the thorn is not bent, and the flower stalk has some small villi; the shooting rule is: shooting the flower stalk at a distance from the flower stalk such that a plurality of thorns appear in the image.

It should be noted that the shooting rule 408 includes, but is not limited to, prompting the user to acquire an image of a particular part of the plant, acquire images of the plant at different angles, or acquire images of the plant at different distances.

Figure 5:
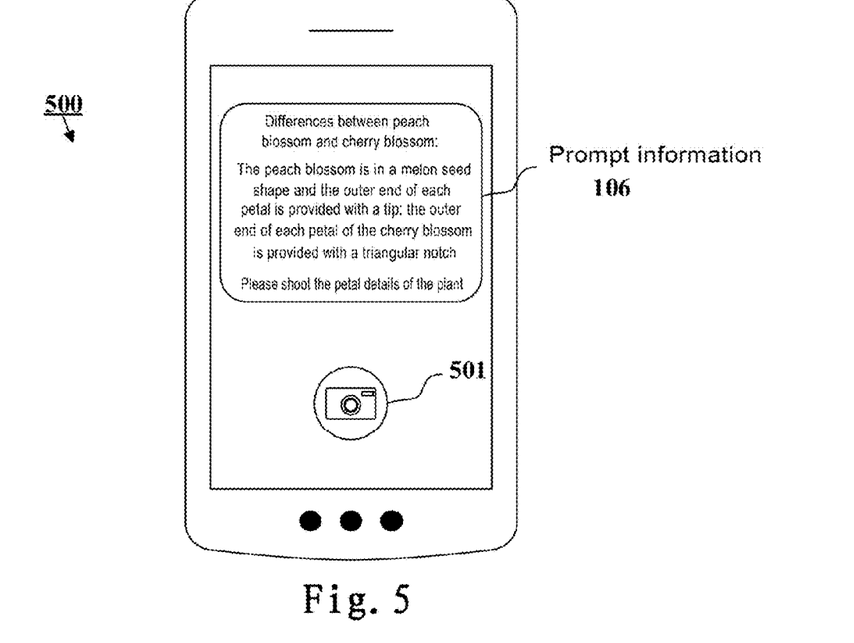
FIG. 5 illustrates a schematic diagram of a user interface with exemplary functions according to one exemplary embodiment of the present disclosure.

The method of the present disclosure may be implemented as an executable program on a personal computer or the like, an application program on a mobile smart device, and/or an applet running in another application program on a mobile smart device, or the like. FIG. 5 illustrates a schematic diagram of a user interface (UI) 500 with exemplary functions according to one exemplary embodiment of the present disclosure. FIG. 5 shows a scenario where the system makes the identification directed to an image from a user and returns a result that includes two confusable plant categories: peach blossom and cherry blossom. The names of the peach blossom and the cherry blossom are retrieved in the rule database 104, and the rule information mapped thereto is searched. According to the distinguishing features in the rule information, the application displays prompt information 106 to the user to inform the user that the difference between the peach blossom and the cherry blossom is that the peach blossom is in a melon seed shape and the outer end of the petal is provided with a tip, and the outer end of the petal of the cherry blossom is provided with a triangular notch. In addition, according to the shooting rule in the rule information, the prompt information 106 also includes prompting the user to shoot a specific part of the plant, i.e., details of the petal. The user may press a shooting icon 501 to shoot the plant again so as to present the distinguishing features of the plant, such that the object identification system can further identify the plant. It should be appreciated that the prompt information may be displayed in any of the following ways: text, picture, or a combination of text and picture. In addition, the prompt information can also be displayed in a detail page of the corresponding return result.

Figure 6:
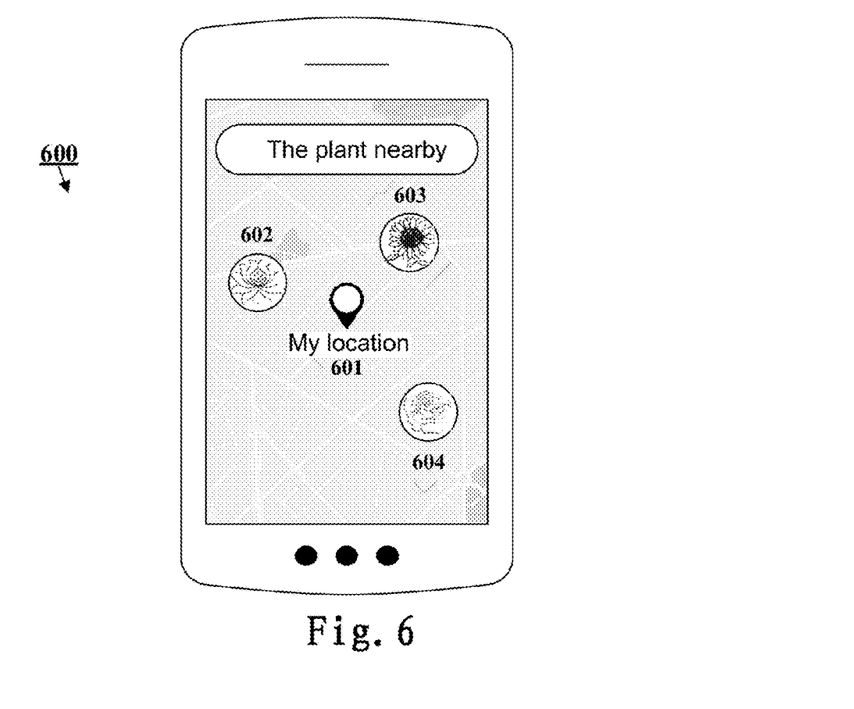
FIG. 6 illustrates a schematic diagram of a user interface with exemplary functions according to another exemplary embodiment of the present disclosure.

FIG. 6 illustrates a schematic diagram of a user interface 600 with exemplary functions according to another exemplary embodiment of the present disclosure. In this embodiment, while the system acquires the first image of the plant from the user, position information (including but not limited to GPS information) is acquired and recorded. The system may display to the user, based on the position information, category information of a plurality of plants in the vicinity of the position, which have been previously captured and stored in the system by the user or other user(s). As an example, as shown in FIG. 6, the background of the user interface 600 is a street map, a position icon 601 displays the position where the user currently acquires the image of the plant, and information on categories and positions of three plants in the vicinity are respectively displayed in circle icons 602-604 around the position icon 601: lotus, sunflower and rose. In one example, if a nearby plant of the same category had previously been captured by the user or other user(s) and a plurality of images thereof have been stored, the system will automatically select a very most recent image from among the plurality of images to be displayed in the user interface 600.

Alternatively or additionally, the system disclosed and described in the present disclosure allows a user to upload the acquired first image and second image to a common platform that allows the user to "like" or comment on the images uploaded by himself/herself or others.

Alternatively or additionally, the system disclosed and described in the present disclosure acquires and records position information, season information, and time information at the time when the first image and the second image of the plant are acquired, and excludes impossible plant categories first based on the above position information and season information when identifying the category of the plant. Further, the system may store the image of the plant acquired by the user in a sample library of the plant category, and record physiological cycle information and morphological information corresponding to the position information, season information, and time information at the time when the image is acquired.

Alternatively or additionally, the system disclosed and described in the present disclosure may add the identified plant category to a list of users and set a maintenance reminder, including a watering alarm clock, etc.

The system and method of the present disclosure creates a rule database that includes names of the confusable plant categories and corresponding distinguishing features thereof, and shooting rules. When the object identification model identifies at least one result, the rule database is searched for a plant category which is easily confused with the at least one result, and the at least one result and the plant category which are easily confused with the at least one result are all returned to the user. The system and the method of the present disclosure can prompt the user of the differences between these confusable plant categories and prompt the user to acquire specific images of the plant capable of presenting the distinguishing features so as to obtain the identification result with higher accuracy. The present disclosure provides a more professional plant identification result for the user, and continuously updates the database after the identification, so as to continuously improve the identification accuracy.

Figure 7:
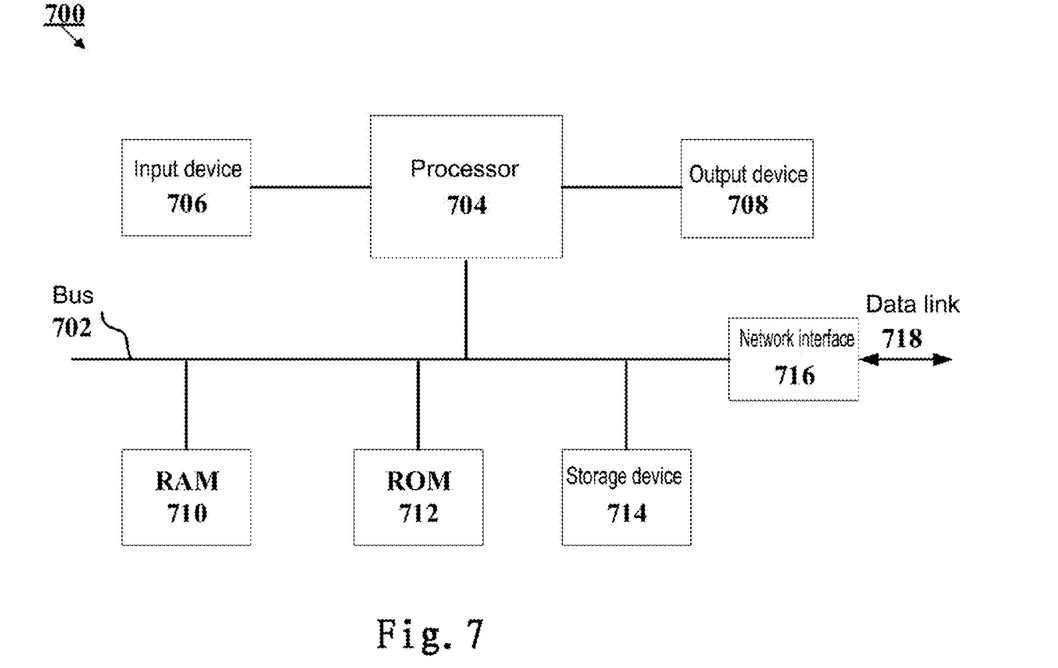
FIG. 7 illustrates an exemplary configuration of a computing device in which embodiments according to the present disclosure may be implemented.

FIG. 7 illustrates an exemplary configuration of a computing device 700 in which embodiments according to the present disclosure may be implemented. Computing device 700 is an example of a hardware device to which the above-described aspects of the invention may be applied. The computing device 700 may be any machine configured to perform processing and/or computing. The computing device 700 may be, but is not limited to, a workstation, a server, a desktop computer, a laptop computer, a tablet computer, a Personal Data Assistant (PDA), a smart phone, an on-board computer, or a combination thereof.

As shown in FIG. 7, the computing device 700 may include one or more elements connected to or in communication with a bus 702, possibly via one or more interfaces. The bus 702 may include, but is not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus. The computing device 700 may include, for example, one or more processors 704, one or more input devices 706, and one or more output devices 708. The one or more processors 704 may be any kind of processor and may include, but is not limited to, one or more general purpose processors or special purpose processors (such as a special purpose processing chip). The input device 706 can be any type of input device capable of inputting information to the computing device and can include, but is not limited to, a mouse, a keyboard, a touch screen, a microphone, and/or a remote controller. The output device 708 may be any type of device capable of presenting information and may include, but is not limited to, a display, a speaker, a video/audio output terminal, a vibrator, and/or a printer.

The computing device 700 may also include or be connected to a non-transitory storage device 714, which may be any non-transitory storage device that can implement data storage, and may include, but is not limited to, a disk drive, an optical storage device, a solid-state memory, a floppy disk, a flexible disk, a hard disk, a magnetic tape, or any other magnetic medium, a compact disk, or any other optical medium, a cache memory, and/or any other memory chip or module, and/or any other medium from which a computer can read data, instructions, and/or code. The computing device 700 may also include a random access memory (RAM) 710 and a read-only memory (ROM) 712. The ROM 712 may store programs, utilities, or processes to be executed in a non-volatile manner. The RAM 710 may provide volatile data storage and store instructions related to the operation of the computing device 700. The computing device 700 may also include a network/bus interface 716 coupled to a data link 718. The network/bus interface 716 may be any type of device or system capable of enabling communication with external apparatuses and/or networks and may include, but is not limited to, a modem, a network card, an infrared communication device, a wireless communication device, and/or a chipset (such as a bluetooth™ device, a 802.11 device, a WiFi device, a WiMax device, a cellular communication facility, etc.).

Various aspects, embodiments, implementations, or features of the foregoing embodiments may be used alone or in any combination. Various aspects of the foregoing embodiments may be implemented by software, hardware, or a combination of hardware and software.

For example, the foregoing embodiments may be embodied as computer readable code on a computer readable medium. The computer readable medium is any data storage device that can store data which is readable by a computer system thereafter. Examples of the computer-readable medium include read-only memory, random-access memory, CD-ROM, DVD, magnetic tape, hard drive, solid-state drive, and optical data storage device. The computer readable medium can also be distributed over network coupled computer systems so that the computer readable code is stored and executed in a distributed fashion.

For example, the foregoing embodiments may take the form of hardware circuitry. The hardware circuitry may include any combination of combined logic circuits, clock storage devices (such as floppy disks, flip-flops, latches, etc.), finite state machines, memories such as static random access memories or embedded dynamic random access memories, custom designed circuitry, programmable logic arrays, etc.

While several specific embodiments of the present disclosure have been illustrated in detail by way of example, it should be understood by those skilled in the art that the foregoing examples are intended to be illustrative only but do not limit the scope of the invention. It will be appreciated that some of the steps of the foregoing methods need not be performed in the order illustrated, but they may be performed simultaneously, in a different order, or in an overlapping manner. In addition, one skilled in the art may add some steps or omit some steps as desired. Some of the components of the foregoing system need not be arranged as shown and one skilled in the art may add or omit some components as desired. It will be appreciated by those skilled in the art that the above-described embodiments may be modified without departing from the scope and spirit of the present disclosure. The scope of the present disclosure is defined by the appended claims.

The invention claimed is:

1. A method for object identification, comprising:
acquiring a first image presenting at least a part of an object from a user;
identifying a category of the object through a pre-established object identification model based on the first image, to obtain at least one result;
searching a rule database containing at least one set of confusable object categories using the at least one result, wherein the rule database provides prompt information for acquiring a second image of the object to distinguish between confusable objects in the at least one set of confusable object categories to determine whether there is a confusable object category corresponding to the at least one result; and
if there is a confusable object category corresponding to the at least one result in the rule database, returning the at least one result and the confusable object category corresponding thereto to the user.

2. The method according to claim 1, further comprising:
providing prompt information to the user, the prompt information indicating a distinguishing feature between the at least one result and the confusable object category corresponding thereto and prompting the user to acquire the second image of the object capable of presenting the distinguishing feature.

3. The method according to claim 2, wherein the rule database contains names of the at least one set of confusable object categories and distinguishing features of the confusable object categories, and wherein the prompt information is based on the rule database.

4. The method according to claim 1, wherein determining that at least two object categories belong to confusable object categories by one or more of:
the at least two object categories are common confusable object categories;
when the user provides an image of one object category of the at least two object categories for other users to authenticate and vote on the one object category, numbers of other object categories in the at least two object categories in the authenticating and voting results are each larger than a threshold;
the numbers of other object categories in the at least two object categories are each larger than a threshold in a result of judging the one object category of the at least two object categories by all users; and
using a test sample set of any one of the at least two object categories to test an object identification model that is established using a training sample set, wherein an identification result in a test result is that the numbers of the at least two object categories are each larger than a threshold.

5. The method according to claim 1, wherein the object comprises a plant, and the at least one result and the confusable object category corresponding thereto comprise at least two varieties in a same species, or at least two species.

6. The method according to claim 2, characterized by:
the prompt information is provided to the user as one of: text, picture, or a combination of picture and text.

7. The method according to claim 3, characterized by:
the rule database further comprises shooting rules for a confusable plant category, that correspond to distinguishing features of the confusable plant category, and the prompt information further comprises prompting the user for the shooting rules, the shooting rules comprising acquiring an image of a specific part of the object, acquiring an image of at least a part of the object at different angles, or acquiring an image of at least a part of the object at different distances.

8. The method according to claim 2, further comprising:
determining the category of the object through the object identification model based on the acquired second image of the object capable of presenting the distinguishing feature.

9. The method according to claim 1, wherein the object identification model comprises a depth convolution neural network or a depth residual network.

10. The method according to claim 1, further comprising:
the at least one result each has a respective likelihood, and when the at least one result includes at least two results having a likelihood greater than a threshold, if the at least two results exist in the rule database, providing prompt information to the user, the prompt information indicating a distinguishing feature of the at least two results and prompting the user to acquire a second image of the object capable of presenting the distinguishing feature.

11. The method according to claim 1, further comprising:
the at least one result each has a respective likelihood, and when the at least one result includes at least two results having a likelihood greater than a threshold, if the at least two results do not exist in the rule database, adding the at least two results to the rule database as new confusable object categories, such that the rule database can thereafter be updated for the new confusable object categories.

12. A system comprising:
one or more processors, and
one or more memories configured to store a series of computer-executable instructions and computer-accessible data associated with the series of computer-executable instructions,
wherein when executed by the one or more processors, the series of computer-executable instructions cause the one or more processors to:
acquire a first image presenting at least a part of an object from a user;
identify a category of the object through a pre-established object identification model based on the first image, to obtain at least one result;
search a rule database containing at least one set of confusable object categories using the at least one result, to determine whether there is a confusable object category corresponding to the at least one result, wherein the rule database provides prompt information for acquiring a second image of the object to distinguish between confusable objects in the at least one set of confusable object categories; and
if there is a confusable object category corresponding to the at least one result in the rule database, return the at least one result and the confusable object category corresponding thereto to the user.

13. The system according to claim 12, wherein when executed by the one or more processors, the series of computer-executable instructions further cause the one or more processors to:
provide prompt information to the user, the prompt information indicating a distinguishing feature between the at least one result and the confusable object category corresponding thereto and prompting the user to acquire the second image of the object capable of presenting the distinguishing feature.

14. The system according to claim 13, wherein the rule database contains names of the at least one set of confusable object categories and distinguishing features of the confusable object categories, and wherein the prompt information is based on the rule database.

15. The system according to claim 12, wherein determining that at least two object categories belong to confusable object categories by one or more of:
the at least two object categories are common confusable object categories;
when the user provides an image of one object category of the at least two object categories for other users to authenticate and vote on the one object category, numbers of other object categories in the at least two object categories in the authenticating and voting results are each larger than a threshold;
the numbers of other object categories in the at least two object categories are each larger than a threshold in the result of judging the one object category of the at least two object categories by all users; and using a test sample set of any one of the at least two object categories to test the object identification model that is established using a training sample set, wherein the identification result in the test result is that the numbers of the at least two object categories are each larger than a threshold.

16. The system according to claim 12, wherein:
the rule database further comprises shooting rules for a confusable plant category, that correspond to distinguishing features of the confusable plant category, and prompt information further comprises prompting the user for the shooting rules, the shooting rules comprising acquiring an image of a specific part of the object, acquiring an image of at least a part of the object at different angles, or acquiring an image of at least a part of the object at different distances.

17. The system according to claim 13, wherein when executed by the one or more processors, the series of computer-executable instructions further cause the one or more processors to:
determine the category of the object through the object identification model based on the acquired second image of the object capable of presenting the distinguishing feature.

18. The system according to claim 12, wherein the at least one result each has a respective likelihood, and when executed by the one or more processors, the series of computer-executable instructions further cause the one or more processors to:
when the at least one result includes at least two results having a likelihood greater than a threshold, if the at least two results exist in the rule database, provide prompt information to the user, the prompt information indicating the distinguishing feature of the at least two results and prompting the user to acquire the second image of the object capable of presenting the distinguishing feature.

19. The system according to claim 12, wherein the at least one result each has a respective likelihood, and when executed by the one or more processors, the series of computer-executable instructions further cause the one or more processors to:
when the at least one result includes at least two results having a likelihood greater than a threshold, if the at least two results do not exist in the rule database, add the at least two results to the rule database as new confusable object categories, such that the rule database can thereafter be updated for the new confusable object categories.

20. A non-transitory computer-readable medium having stored thereon a series of computer-executable instructions that, when executed by one or more computing devices, cause the one or more computing devices to:
acquire a first image presenting at least a part of an object from a user;
identify a category of the object through a pre-established object identification model based on the first image, to obtain at least one result;
search a rule database containing at least one set of confusable object categories using the at least one result, to determine whether there is a confusable object category corresponding to the at least one result wherein the rule database provides prompt information for acquiring a second image of the object to distinguish between confusable objects in the at least one set of confusable object categories; and
if there is a confusable object category corresponding to the at least one result in the rule database, return the at least one result and the confusable object category corresponding thereto to the user.

* * * * *